(12) United States Patent
Jones

(10) Patent No.: US 11,430,289 B2
(45) Date of Patent: Aug. 30, 2022

(54) WIRELESS USER INTERFACE ELEMENTS FOR GAMING DEVICES

(71) Applicant: IGT, Las Vegas, NV (US)

(72) Inventor: Scott Jones, Reno, NV (US)

(73) Assignee: IGT, Las Vegas, NV (US)

( * ) Notice: Subject to any disclaimer, the term of this patent is extended or adjusted under 35 U.S.C. 154(b) by 49 days.

(21) Appl. No.: 16/926,874

(22) Filed: Jul. 13, 2020

(65) Prior Publication Data

US 2020/0410812 A1 Dec. 31, 2020

Related U.S. Application Data

(63) Continuation of application No. 15/967,701, filed on May 1, 2018, now abandoned.

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *H04B 5/00* | (2006.01) |

(52) U.S. Cl.
CPC ...... *G07F 17/3223* (2013.01); *G07F 17/3211* (2013.01); *H04B 5/0037* (2013.01); *H04B 5/0081* (2013.01)

(58) Field of Classification Search
USPC .................. 463/1, 20, 22, 25, 30, 31, 35, 39
See application file for complete search history.

(56) References Cited

U.S. PATENT DOCUMENTS

| | | | |
|---|---|---|---|
| 2007/0109208 A1 | 5/2007 | Turner | |
| 2008/0188292 A1 | 8/2008 | Walker | |
| 2009/0270790 A1* | 10/2009 | Raghavan | ............ A61B 8/0816 604/22 |
| 2011/0127951 A1 | 6/2011 | Walley | |
| 2017/0038641 A1* | 2/2017 | Yamazaki | ......... G02F 1/133308 |
| 2017/0148260 A1* | 5/2017 | Dunn | .................. G07F 17/3234 |

* cited by examiner

*Primary Examiner* — Adetokunbo O Torimiro
(74) *Attorney, Agent, or Firm* — Sage Patent Group

(57) ABSTRACT

A user interface assembly for a gaming device includes a first-side transceiver subassembly on a first side of a barrier, including a first-side antenna and a first-side transmitter circuit electronically coupled to the first-side antenna for transmitting an electromagnetic power signal through the barrier via the first-side antenna. The user interface assembly also includes a second-side transceiver subassembly on a second side of the barrier opposite the first-side transceiver subassembly, including a second-side antenna disposed opposite the first-side antenna relative to the barrier, and a second-side receiver circuit electronically coupled to the second-side antenna for receiving, via the second-side antenna, the electromagnetic power signal transmitted through the barrier. The second-side transceiver subassembly also includes a second-side user interface circuit including a first user interface element for outputting an indication to a user of the gaming device in response to the second-side receiver circuit receiving the electromagnetic power signal.

20 Claims, 9 Drawing Sheets

WIRELESS USER INTERFACE ELEMENTS FOR GAMING DEVICES

PRIORITY CLAIM

This application is a continuation of, and claims priority to and the benefit of, U.S. patent application Ser. No. 15/967,701, which was filed May 1, 2018, entire contents of which is incorporated by reference herein.

FIELD

Embodiments described herein relate to user interface elements, and in particular to wireless user interface elements for gaming devices.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens.

SUMMARY

According to some embodiments, a user interface assembly for a gaming device is disclosed. The user interface assembly includes a first-side transceiver subassembly on a first side of a barrier of the gaming device. The barrier is an electrical insulator that is between an internal portion of the gaming device and an area outside of the gaming device. The first-side transceiver subassembly includes a first-side antenna and a first-side transmitter circuit electronically coupled to the first-side antenna for transmitting an electromagnetic power signal through the barrier via the first-side antenna. The first-side transceiver subassembly also includes a first-side device interface for electronically coupling the first-side receiver circuit to a power supply of the gaming device. The user interface assembly also includes a second-side transceiver subassembly on a second side of the barrier opposite the first-side transceiver subassembly. The second-side transceiver subassembly includes a second-side antenna disposed opposite the first-side antenna relative to the barrier, and a second-side receiver circuit electronically coupled to the second-side antenna for receiving, via the second-side antenna, the electromagnetic power signal transmitted through the barrier. The second-side transceiver subassembly also includes a second-side user interface circuit electronically coupled to the second-side receiver circuit. The second-side user interface circuit includes a first user interface element for outputting an indication to a user of the gaming device in response to the second-side receiver circuit receiving the electromagnetic power signal.

According to further embodiments, a method of operating a user interface assembly for a gaming device is disclosed. The method includes transmitting, by a first-side transmitter circuit on a first side of a barrier of the gaming device, an electromagnetic power signal through the barrier via a first-side antenna on the first side of the barrier. The barrier is an electrical insulator that is between an internal portion of the gaming device and an area outside of the gaming device. The method further includes receiving, by a second-side receiver circuit on a second side of the barrier, the electromagnetic power signal through the barrier via a second-side antenna on the second side of the barrier opposite the first-side antenna relative to the barrier. The method further includes, in response to the second-side receiver circuit receiving the electromagnetic power signal, outputting an indication to a user of the gaming device via a first user interface element of a second-side user interface circuit.

According to further embodiments, a gaming device includes a housing forming an internal portion, a power supply, and a user interface assembly. The housing includes a barrier that is an electrical insulator between the internal portion of the gaming device and an area outside of the gaming device. The user interface assembly includes a first-side transceiver subassembly on a first side of the barrier, including a first-side antenna and a first-side transmitter circuit electronically coupled to the first-side antenna for transmitting an electromagnetic power signal through the barrier via the first-side antenna. The first-side transceiver subassembly further includes a first-side device interface for electronically coupling the first-side transmitter circuit to the power supply. The user interface assembly further includes a second-side transceiver subassembly on a second side of the barrier opposite the first-side transceiver subassembly, including a second-side antenna disposed opposite the first-side antenna relative to the barrier, and a second-side receiver circuit electronically coupled to the second-side antenna for receiving, via the second-side antenna, the electromagnetic power signal transmitted through the barrier. The second-side transceiver subassembly further includes a second-side user interface circuit electronically coupled to the second-side receiver circuit. The second-side user interface circuit includes a first user interface element for outputting an indication to a user of the gaming device in response to the second-side receiver circuit receiving the electromagnetic power signal.

DETAILED DESCRIPTION

Figure 1:
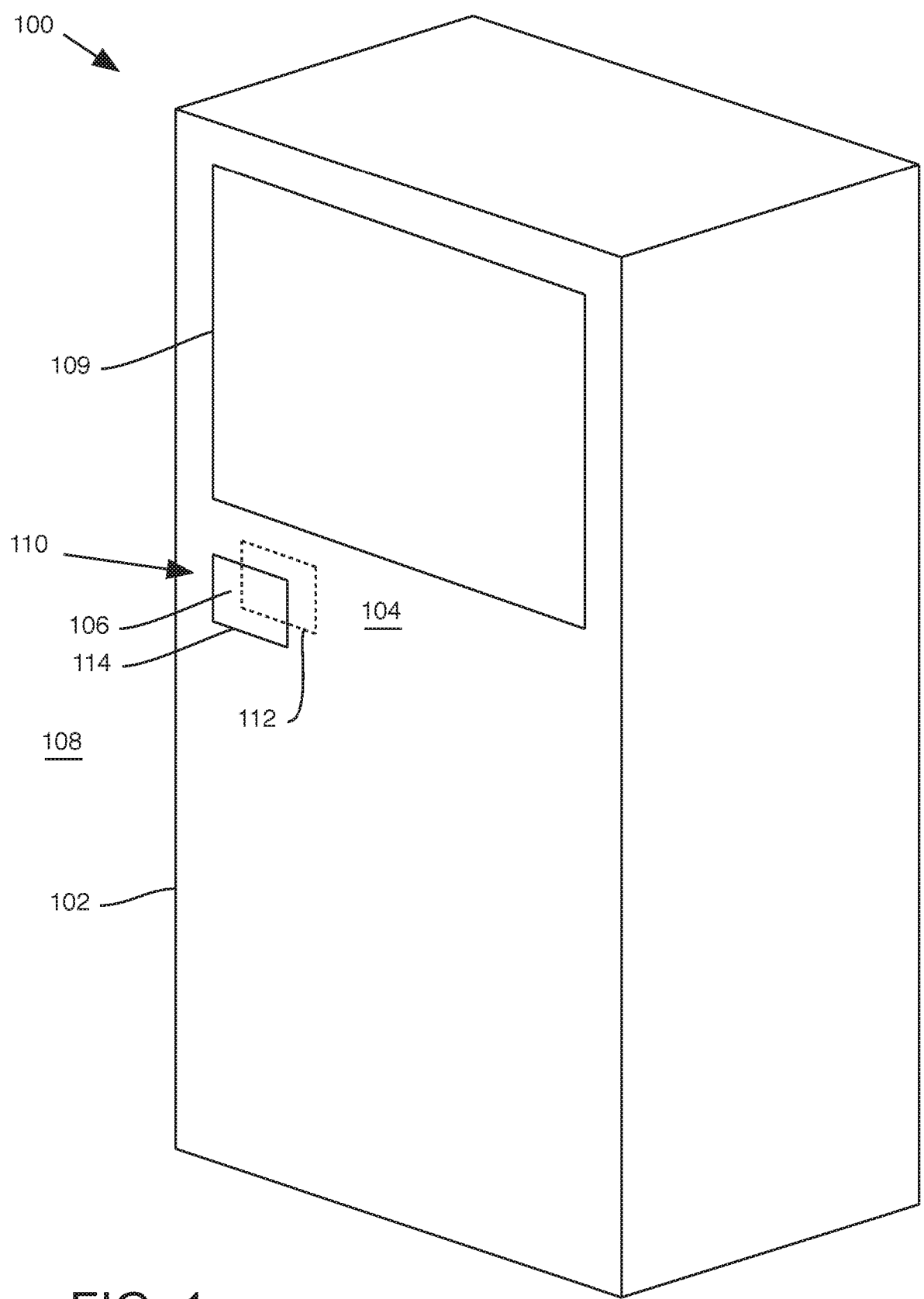
FIG. 1 illustrates an electronic gaming machine (EGM) having a user interface assembly that wirelessly delivers power to an external user interface element, according to some embodiments.

Embodiments described herein relate to user interface elements, and in particular to wireless user interface elements for gaming devices. In some embodiments, a user interface assembly for a gaming device includes a first-side transceiver subassembly and a second-side transceiver subassembly on opposite sides of a barrier of the gaming device. The barrier is an electrical insulator that is between an internal portion of the gaming device and an area outside of the gaming device. The first-side transceiver subassembly includes a first-side antenna and a first-side transmitter circuit electronically coupled to the first-side antenna for transmitting an electromagnetic power signal through the barrier via the first-side antenna. The first-side transceiver subassembly also includes a first-side device interface for electronically coupling the first-side receiver circuit to a power supply of the gaming device. The user interface assembly also includes a second-side transceiver subassembly on a second side of the barrier opposite the first-side transceiver subassembly. The second-side transceiver subassembly includes a second-side antenna disposed opposite the first-side antenna relative to the barrier, and a second-side receiver circuit electronically coupled to the second-side antenna for receiving, via the second-side antenna, the electromagnetic power signal transmitted through the barrier. The second-side transceiver subassembly also includes a second-side user interface circuit electronically coupled to the second-side receiver circuit. The second-side user interface circuit includes a first user interface element for outputting an indication to a user of the gaming device in response to the second-side receiver circuit receiving the electromagnetic power signal.

One advantage of these and other embodiments is that power can be wirelessly provided to an external component of a gaming device, while still protecting the gaming device and its internal components from exposure to an external environment and/or other hazards. Another advantage is that interface elements may be mounted or adhered in locations where interconnecting wires are not possible or practical. Additional advantages include being able to position user interface elements in different locations that may not be practical for wired applications, and allowing for miniaturization of components in ways that may not be practical for wired applications.

For example, as gaming machine designs move toward more modern appearances, new materials are being used, including strengthened or tempered glass panels having embedded display panels, which contribute to a smooth, clean appearance, and also protect the display panels and other internal components from exposure to external hazards, such as spilled drinks or other accidental damage. Providing physical buttons and other user interface elements for this type of design introduces new problems, however. To provide a traditional wired user interface element, holes must extend through the glass panel, which may significantly weaken the structural integrity of the panel, and which may lead to cracking, shattering, and other types of failures when the glass panel is subjected to physical loads as are commonly encountered in normal use These holes may provide a potential interface between the interior components and the external environment, which may contribute to internal component failures. In addition, the locations of these holes may be constrained by the structural requirements of the panels. These and other drawbacks may apply even when different materials are used for the barrier, such as strengthened plastic, for example. Embodiments disclosed herein address these and other problems by providing replaceable user interface elements that do not require weakening the panel and that do not require exposing the interior of the gaming device to additional external hazards.

In this regard, FIG. 1 illustrates an electronic game machine (EGM) 100 having a housing 102 forming an interior 104 (i.e., an internal portion). The housing 102 includes a barrier 106 that is an electrical insulator between the interior 104 of the EGM 100 and an exterior environment 108 (i.e., an area outside the interior 104) of the EGM 100. In this example, the barrier 106, which may be a strengthened glass panel, includes an embedded display 109. The EGM 100 includes a user interface assembly 110 having a pair of transceiver subassemblies 112, 114 on opposite sides of the barrier. The first-side transceiver subassembly 112 is located on the barrier 106 in the interior 104 of the EGM, and the second-side transceiver subassembly 114 is located on the barrier 106 opposite the first-side transceiver subassembly 112 in the exterior environment 108. In this example, the first-side transceiver subassembly 112 transmits an electromagnetic (EM) power signal to the second-side transceiver subassembly 114 wirelessly through the barrier 106, so that the second-side transceiver subassembly 114 can operate while separating and protecting the first-side transceiver subassembly 112 and other internal components of the EGM 100 from the exterior environment 108.

Figure 2:
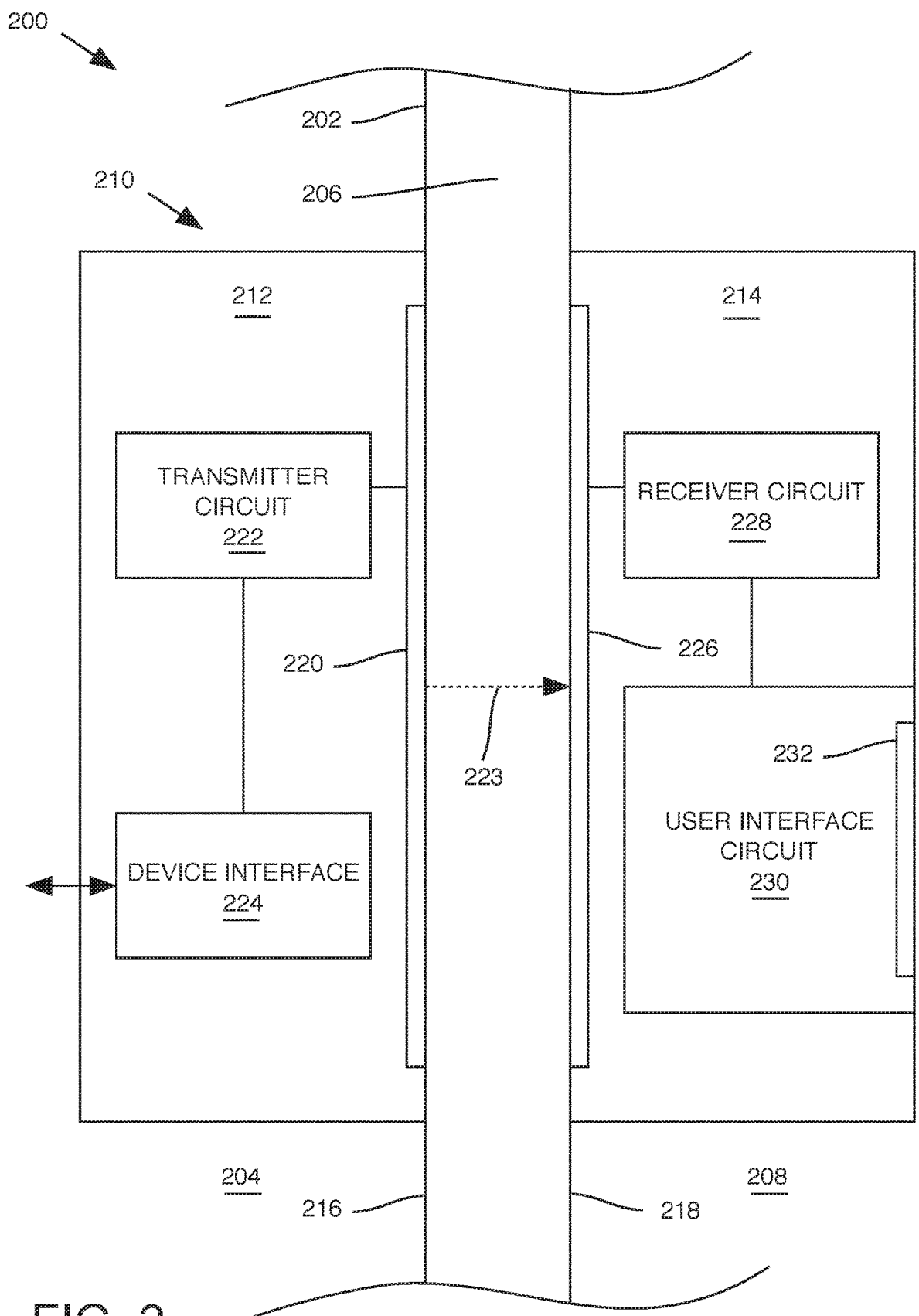
FIG. 2 is a diagram illustrating a cross-section of a user interface assembly similar to the user interface assembly of FIG. 1, according to some embodiments.

Referring now to FIG. 2, a schematic cross section of a user interface assembly 210 similar to the user interface assembly 110 of FIG. 1 is illustrated. A portion of the barrier 206 has an interior side 216 facing the interior 204 of the housing 202 of the EGM 200, and an exterior side 218 facing the exterior environment 208. The first-side transceiver subassembly 212 has a first-side antenna 220 and a first-side transmitter circuit 222 electronically coupled to the first-side antenna 220 for transmitting the EM power signal 223 through the barrier 206 via the first-side antenna 220. In this example, the barrier 206 is an electrical insulator (e.g., a non-metallic material such as glass) that is electromagnetically transparent to EM signals in a particular frequency band, including the EM power signal 223 and/or other EM signals disclosed herein. As used herein, for the barrier 206 to be "electromagnetically transparent" to a particular EM signal means that the EM signal can pass through the barrier 206 without losing more than 10% of its signal strength. It should be understood, however, that other levels of electromagnetic transparency, e.g., allowing signal losses of 1%, 5%, 15%, 20%, 50%, 75%, 95% et al., might be acceptable in different applications. This allows the EM power signal 223 to pass through the barrier 206 without losing an unacceptable amount of signal strength, while protecting the internal components within the housing 202 from exposure to the exterior environment 208. For example, for a simple TTL or other EM data signal indicative of a button being pressed, a large amount of signal loss may be acceptable, because detecting a binary on/off voltage or other signal may be relatively easy to detect. On the other hand, for complex data signals, such as a signal indicative graphical interface information or a rotational position of a rotary device, e.g., a dial, significant signal loss may not be acceptable because greater data integrity would be required. The first-side transceiver subassembly 212 also has a first-side device interface 224 electronically coupling the first-side transmitter circuit 222 to a power supply, a processor device and/or other components (not shown) of the EGM 200.

The second-side transceiver subassembly 214 includes a second-side antenna 226 disposed opposite the first-side antenna 220 relative to the barrier 206. The second-side transceiver subassembly 214 also includes a second-side receiver circuit 228 electronically coupled to the second-side antenna 226 for receiving, via the second-side antenna 226, the EM power signal 223 transmitted through the barrier 206 by the first-side transceiver subassembly 212. The second-side transceiver subassembly 214 also includes a second-side user interface circuit 230 electronically coupled to the second-side receiver circuit 228. The second-side user interface circuit 230 includes a first user interface element 232, such as a visual and/or audio indicator, for outputting an indication to a user of the EGM 200 in response to the second-side receiver circuit 228 receiving the EM power signal 223. The indication output by the first user interface element 232 or any other user interface element could include any indication that is detectable by a user, such as a simple LED, a graphical display, an audio alert, a haptic feedback (e.g., vibration), a mechanical movement or effect, or other indication.

Figure 3:
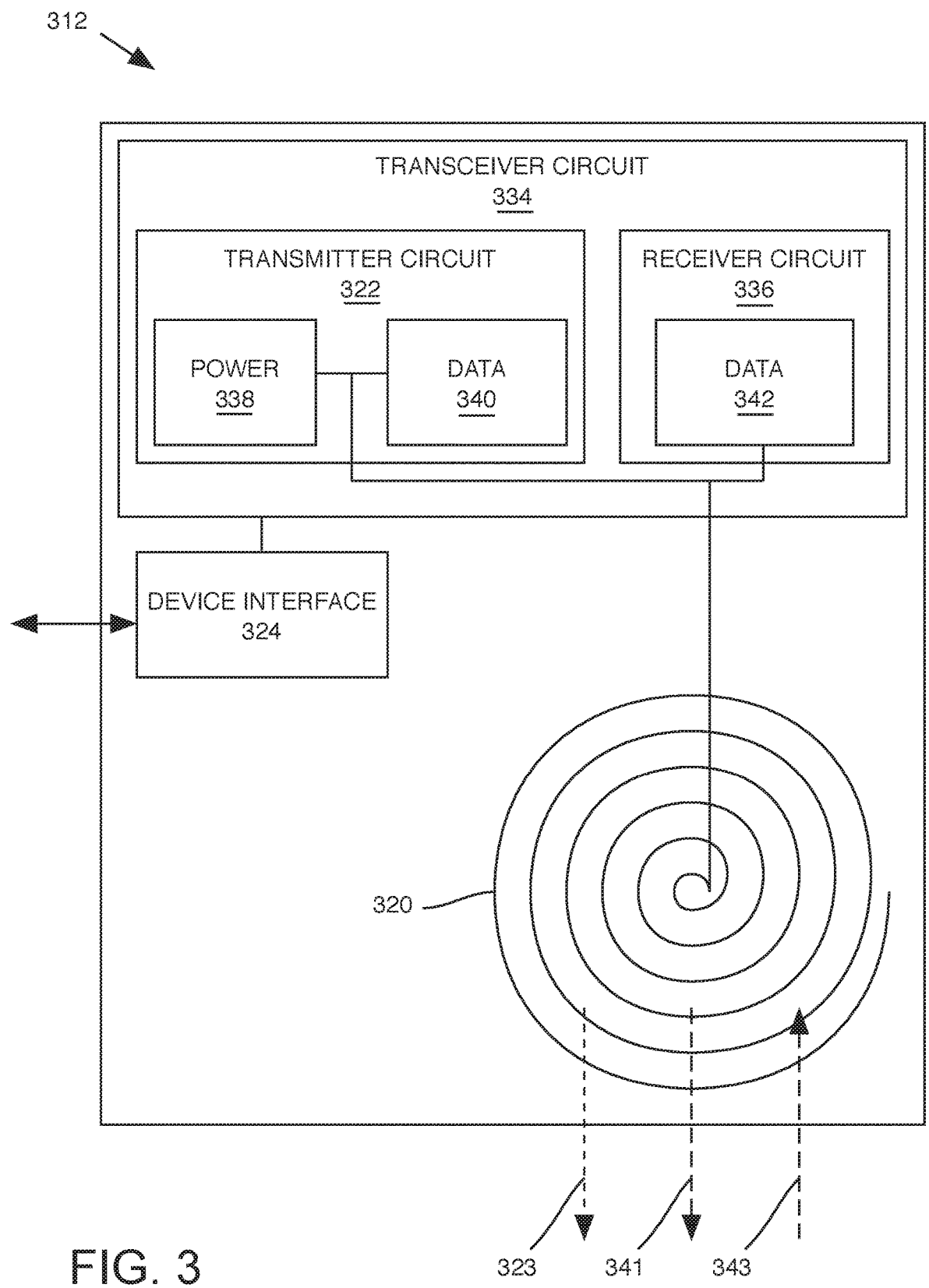
FIG. 3 is a schematic diagram of a first-side transceiver subassembly for transmitting EM power signals and EM data signals, and for receiving EM data signals, according to some embodiments.

In some embodiments, the user interface assembly may also contain functionality for sending and receiving EM data signals between the transceiver subassemblies. In this regard, FIG. 3 illustrates a schematic diagram of a first-side transceiver subassembly 312 similar to the first-side transceiver subassemblies 112, 212 of FIGS. 1 and 2. In this example, the first-side transceiver subassembly 312 includes a first-side transceiver circuit 334 that includes a first-side transmitter circuit 322 and a first-side receiver circuit 336. In this embodiment, the first-side antenna 320 is a flat spiral antenna, but it should be understood that other types of antennas may be used.

The first-side transmitter circuit 322 includes a first-side power transmitter circuit 338 for transmitting the EM power signal 323 via the first-side antenna 320, and a first-side data transmitter circuit 340 for transmitting a downlink EM data signal 341 via the first-side antenna 320. The first-side receiver circuit 336 includes a first-side data receiver circuit 342 for receiving an uplink EM data signal 343 via the first-side antenna 320. The first-side transceiver circuit 334 is electronically coupled to a power supply, a processor device and/or other components of the EGM (not shown) via a first-side device interface 324. In this example, the different EM signals, such as EM power signal 323 and the downlink EM data signal 341 for example, are separate EM signals that are transmitted separately on different frequencies and/or at different times, but it should be understood that EM signals may be combined into a common signal, such as through modulation or other techniques. For example, in some embodiments, a power component (e.g., EM power signal 323) and a data component (e.g., downlink EM data signal 341) may be modulated together to form a combined EM signal, which is then demodulated into its different component by the receiving circuit, such as the second-side transceiver circuit 448 of FIG. 4, for example.

Figure 4:
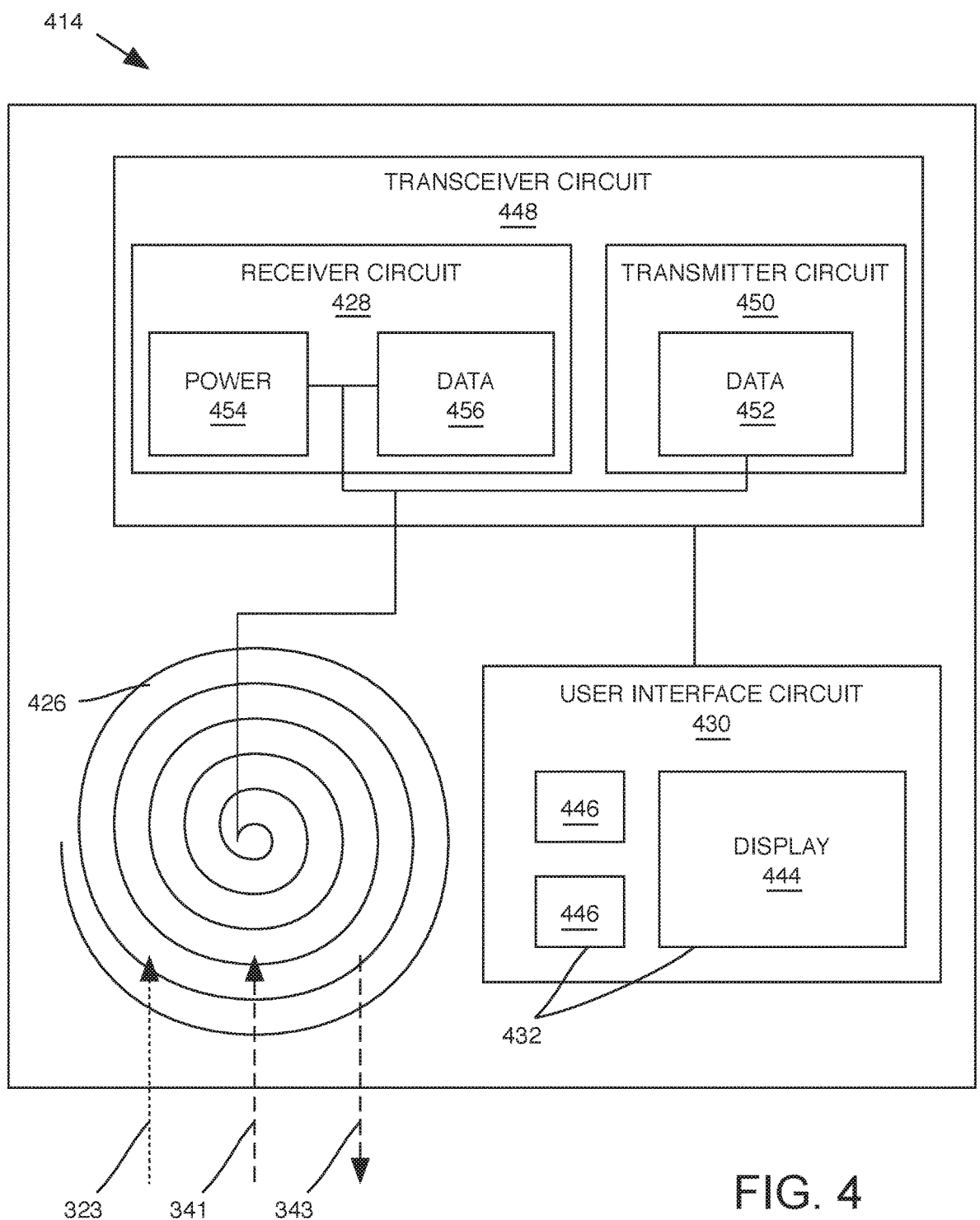
FIG. 4 is a schematic diagram of a second-side transceiver subassembly for receiving EM power signals and EM data signals from the first-side transceiver subassembly of FIG. 3, and for transmitting EM data signals to the first-side transceiver subassembly of FIG. 3, according to some embodiments.

In this regard, a schematic diagram of a complementary second-side transceiver subassembly 414 is illustrated in FIG. 4. FIG. 4 illustrates a plurality of exterior-facing user interface elements 432, including a display 444 and a plurality of input buttons 446 operable by a user. The second-side transceiver subassembly 414 includes a second-side transceiver circuit 448 for receiving the EM power signal 323 to provide power to some or all of the elements of the second side transceiver subassembly 414, including the user interface elements 432, for receiving the downlink EM data signal 341, and for transmitting the uplink EM data signal 343.

As shown in FIG. 4, the second-side transceiver circuit 448 includes a second-side transmitter circuit 450 and a second-side receiver circuit 428. The second-side transmitter circuit 450 includes a second-side data transmitter circuit 452 for transmitting the uplink EM data signal 343 via the second-side antenna 426. In this embodiment, the second-side antenna 426 is a flat spiral antenna that is aligned with and complementary to the flat spiral first-side antenna 320, but it should be understood that other types of antennas may be used.

The second-side receiver circuit 428 includes a second-side power receiver circuit 454 for receiving the EM power signal 323 via the second-side antenna 426 and a second-side data receiver circuit 456 for receiving the downlink EM data signal 341 via the first-side antenna 320. The second-side transceiver circuit 448 is electronically coupled to the user interface elements 432 via a second-side user interface circuit 430.

In the embodiment of FIGS. 3 and 4, the first-side transceiver subassembly 312 wirelessly transmits the EM power signal 323 to the second-side transceiver subassembly 414 to provide power to the second-side transceiver subassembly 414 without requiring the second-side transceiver subassembly 414 to be electrically coupled to the power supply of the EGM (not shown). The first-side subassembly 312 also wirelessly transmits the downlink EM data signal 341 to the second-side transceiver subassembly 414 to provide instructions for operating the user interface elements 432 or other data to the second-side transceiver subassembly 414. The second-side transceiver subassembly 414 generates the uplink EM data signal 343 based on inputs received through the user interface elements 432, based on the downlink EM data signal 341, or other data, and wirelessly transmits the uplink EM data signal 343 to the first-side transceiver subassembly 312, to be used by the first-side transceiver subassembly 312, power supply, processor device, and/or other components of the EGM (not shown).

In the embodiment of FIGS. 3 and 4, the first-side transceiver subassembly 312 includes separate transmitter and receiver circuits within the first-side transceiver circuit 334, and the second-side transceiver subassembly 414 includes separate transmitter and receiver circuits within the second-side transceiver circuit 448, but it should be understood any of the circuits disclosed herein may be incorporated into a common circuit and/or separated out into multiple circuits, as desired. For example, as used herein, a transmitter circuit may also include receiving functionality (e.g., a receiver circuit), a receiver circuit may also include transmitting functionality (e.g., a transmitter circuit), and a transceiver circuit may include transmitting functionality, receiving functionality, or both. In the embodiment of FIGS. 3 and 4 as well, the first-side antenna 320 is a single antenna that is used for both transmitting and receiving the EM signals, and the second-side antenna 426 is also a single antenna that is used for both transmitting and receiving the EM signals. It should be understood, however, that either or both antennas 320, 426 may be separated into multiple antennas used for transmitting and/or receiving different signals.

Figure 5:
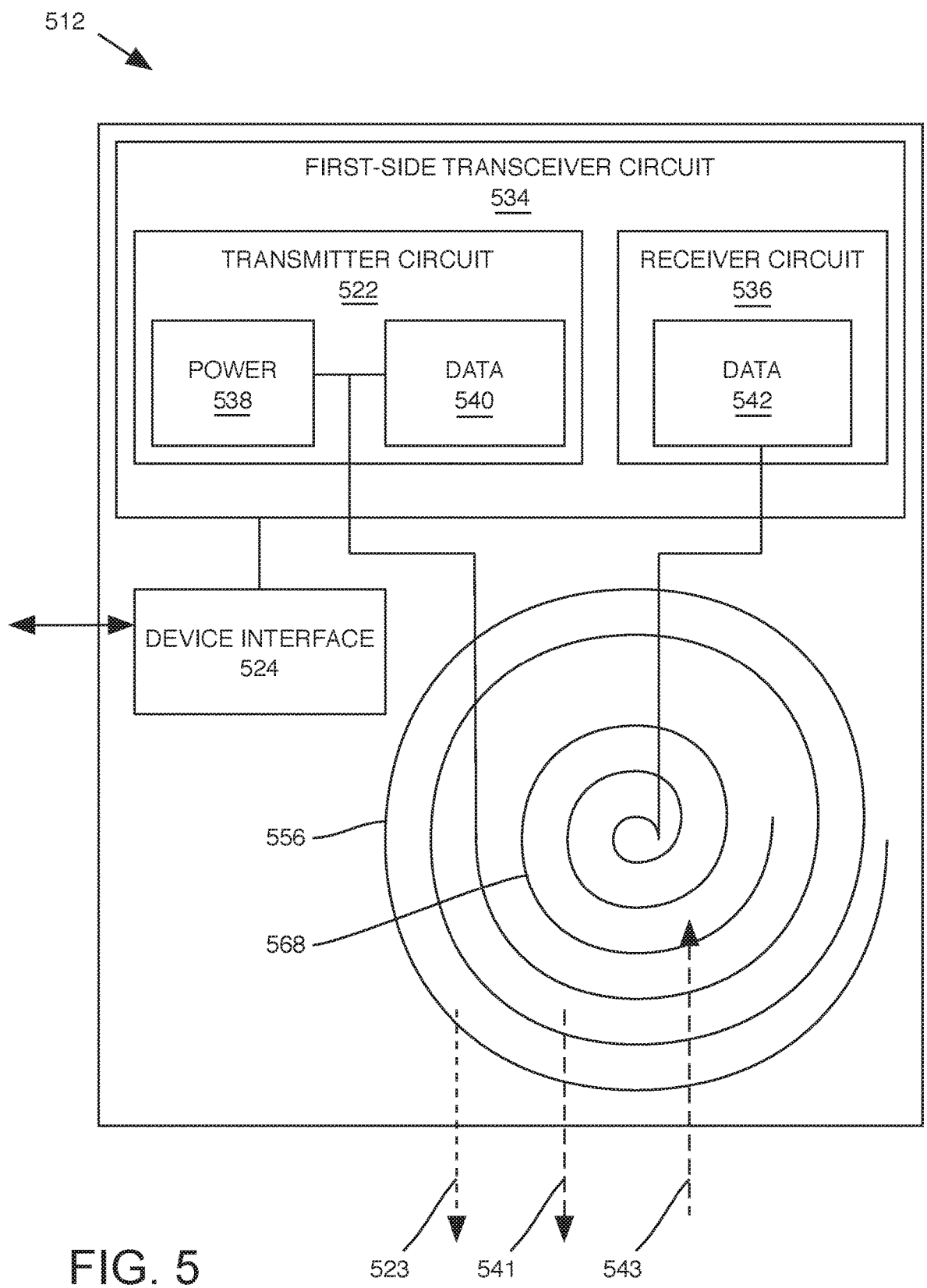
FIG. 5 is a schematic diagram of a first-side transceiver subassembly having multiple concentric antennas, according to some alternative embodiments.

In this regard, FIG. 5 illustrates a first-side transceiver subassembly 512 having multiple concentric antennas according to an embodiment. It should be also understood that features of the first-side transceiver subassembly 512 may also be used with a complementary second-side transceiver sub-assembly (not shown), as desired. FIG. 5 illustrates the first-side transceiver subassembly 512 having a first-side downlink antenna 556 for transmitting the EM power signal 523 and/or the downlink EM data signal 541 and a first-side uplink antenna 558 for receiving the uplink EM data signal 543. In this example, the first-side uplink antenna 558 is a flat spiral antenna nested within the first-side downlink antenna 556, but it should be understood that other configurations are possible. In this example, the first-side antennas 556 and 558 may be aligned with complementary second-side antennas, respectively, on opposite sides of the barrier (not shown), but it should be understood that other configurations are possible. In this example, the first-side antennas 556 and 558 are concentric spiral antennas, which may facilitate a reduced footprint for the first-side transceiver subassembly 512, but it should be understood that other configurations are possible.

Figure 6:
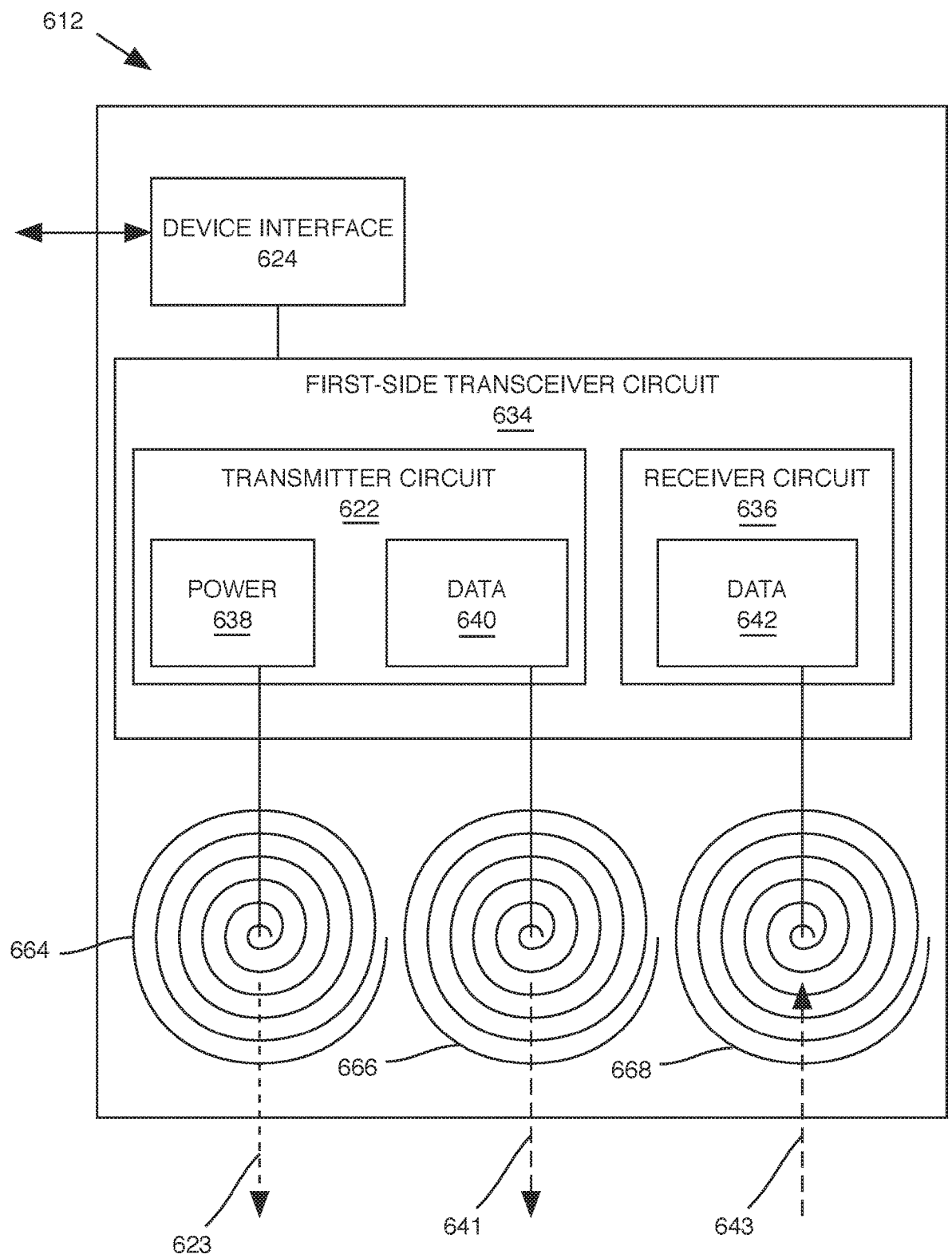
FIG. 6 is a schematic diagram of a first-side transceiver subassembly having multiple, spatially separated antennas, according to some alternative embodiments.

In some embodiments, it may be desirable to transmit and/or receive the EM power signal(s) and EM data signal(s) on separate antennas that may also be spatially separated, to reduce interference and noise for example. In this regard, FIG. 6 illustrates a first-side transceiver subassembly 612 having multiple, spatially separated antennas according to an embodiment. As with FIG. 5 above, it should be also understood that features of the first-side transceiver subassembly 612 may also be used with a complementary second-side transceiver sub-assembly (not shown), as desired. In this regard, FIG. 6 illustrates the first-side transceiver subassembly 612 having a first-side power antenna 664 for transmitting the EM power signal 623, a first-side downlink data antenna 666 for transmitting the downlink EM data signal 641, and a first-side uplink data antenna 668 for receiving the EM data signal 643. In this example, the first-side antennas 664-668 may be aligned with complementary second-side antennas, respectively, on opposite sides of the barrier (not shown), but it should be understood that other configurations are possible.

Figure 7:
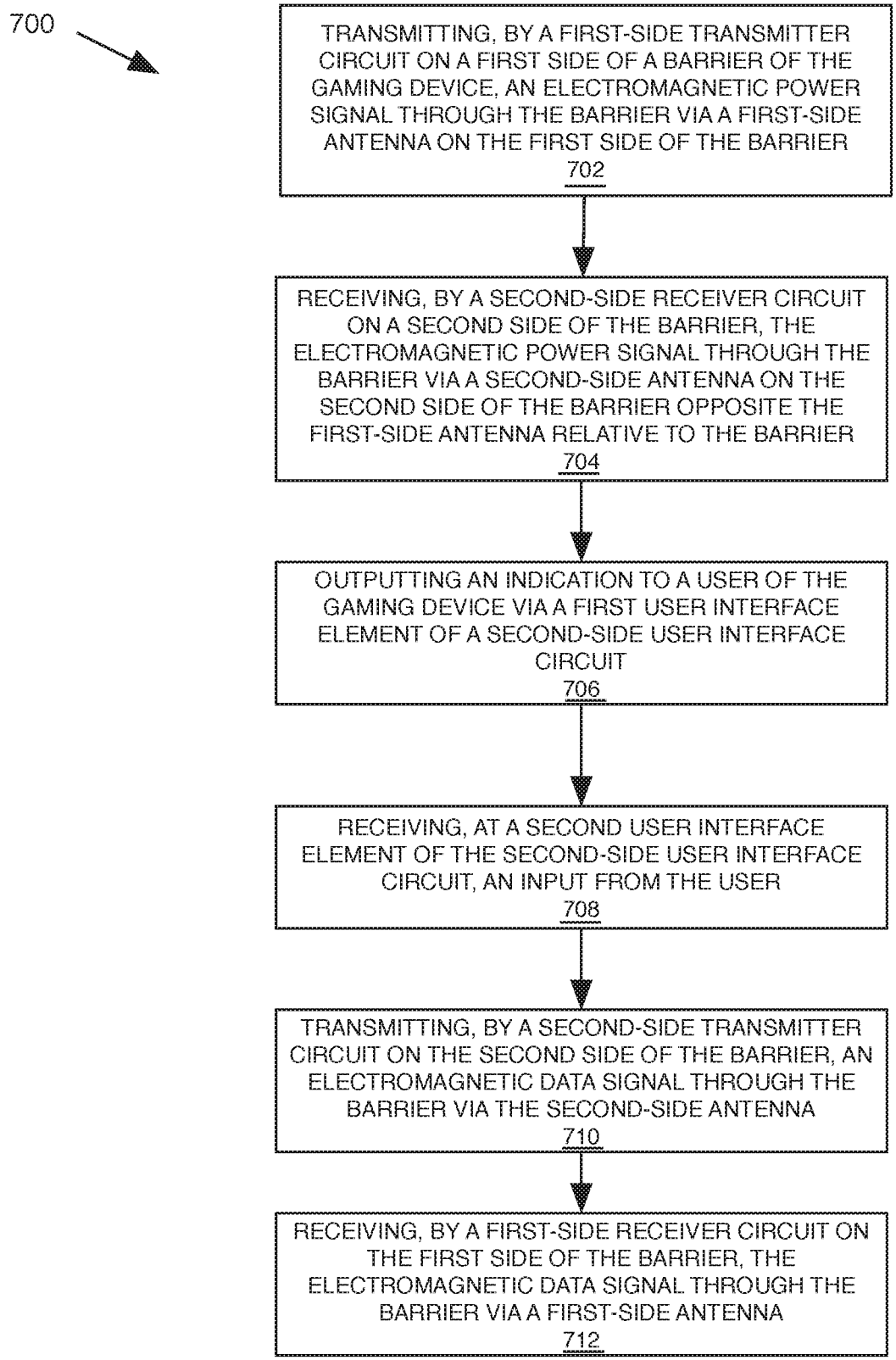
FIG. 7 is a flowchart diagram of a method of operating a user interface assembly for a gaming device, according to an embodiment.

FIG. 7 illustrates a flowchart of a method 700 of operating a user interface assembly for a gaming device, such as the user interface assemblies described above, for example. The method 700 includes transmitting, by a first-side transmitter circuit on a first side of a barrier of the gaming device, an electromagnetic power signal through the barrier via a first-side antenna on the first side of the barrier (Block 702). In this example, the barrier is an electrical insulator that is between an internal portion of the gaming device and an area outside of the gaming device. The method 700 further includes receiving, by a second-side receiver circuit on a second side of the barrier, the electromagnetic power signal through the barrier via a second-side antenna on the second side of the barrier opposite the first-side antenna relative to the barrier (Block 704). The method 700 further includes, in response to the second-side receiver circuit receiving the electromagnetic power signal, outputting an indication to a user of the gaming device via a first user interface element of a second-side user interface circuit (Block 706). In some embodiments, the method 700 may also include receiving, at a second user interface element of the second-side user interface circuit, an input from the user (Block 708). The method 700 may also include transmitting, by a second-side transmitter circuit on the second side of the barrier, an electromagnetic data signal through the barrier via the second-side antenna (710). The method 700 may also include receiving, by a first-side receiver circuit on the first side of the barrier, the electromagnetic data signal through the barrier via a first-side antenna (Block 712).

Figure 8:
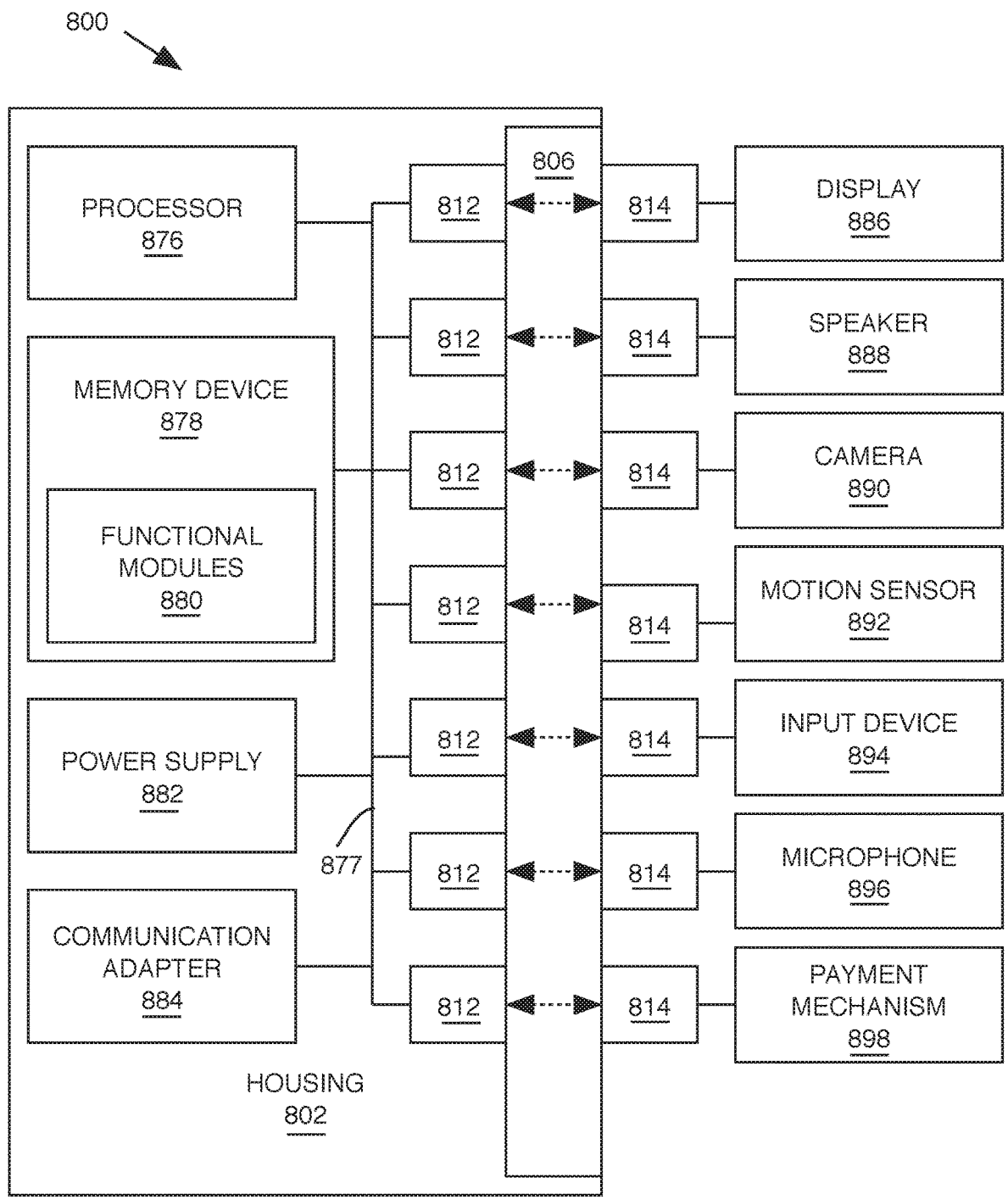
FIG. 8 is a block diagram that illustrates various components of an EGM according to some embodiments.

Reference is now made to FIG. 8, which is a block diagram that illustrates various components of an EGM 800, which may embody or include aspects of the features discussed above, according to some embodiments. As shown in FIG. 8, the EGM 800 may include a processor 876 that controls operations of the EGM 800. Although illustrated as a single processor, multiple special purpose and/or general-purpose processors and/or processor cores may be provided in the EGM 800. For example, the EGM 800 may include one or more of a video processor, a signal processor, a sound processor and/or a communication controller that performs one or more control functions within the EGM 800. The processor 876 may be variously referred to as a "controller," "microcontroller," "microprocessor" or simply a "computer." The processor 876 may further include one or more application-specific integrated circuits (ASICs).

Various components of the EGM 800 are illustrated in FIG. 8 as being connected to the processor 876. It will be appreciated that the components may be connected to the processor 876 and/or each other through one or more busses 877 including a system bus, a communication bus and controller, such as a USB controller and USB bus, a network interface, or any other suitable type of connection.

The EGM 800 further includes a memory device 878 that stores one or more functional modules 880 for performing the operations described above. Alternatively, or in addition, some of the operations described above may be performed by other devices connected to a network, for example. The EGM 800 may communicate with other devices connected to the network to facilitate performance of some of these operations. For example, the EGM 800 may communicate and coordinate with certain EGMs to identify players at a particular EGM.

The memory device 878 may store program code and instructions, executable by the processor 876, to control the EGM 800. The memory device 878 may include random access memory (RAM), which can include non-volatile RAM (NVRAM), magnetic RAM (MRAM), ferroelectric RAM (FeRAM) and other forms as commonly understood in the gaming industry. In some embodiments, the memory device 878 may include read only memory (ROM). In some embodiments, the memory device 878 may include flash memory and/or EEPROM (electrically erasable programmable read only memory). Any other suitable magnetic, optical and/or semiconductor memory may operate in conjunction with the gaming device disclosed herein.

The EGM 800 may include a power supply 882 that provides power to EGM 800 and its components. The power supply 882 may be a conventional power supply that may be plugged into an AC or DC electrical socket, or may be hard-wired into an electrical power system or grid, such as a building power supply. The power supply 882 may also include a battery that provides power to the EGM 800 and/or certain components in the event that the EGM is disconnected from an AC or DC power source, for example.

The EGM 800 may include a communication adapter 884 that enables the EGM 800 to communicate with remote devices, such as the wireless network, another EGM 800, and/or a wireless access point, over a wired and/or wireless communication network, such as a local area network (LAN), wide area network (WAN), cellular communication network, or other data communication network.

The EGM 800 may include one or more internal or external communication ports that enable the processor 876 to communicate with and to operate with internal or external peripheral devices and/or interface elements, such as displays 886, speakers 888, cameras 890, sensors, such as motion sensors 892, input devices 894, such as buttons, switches, keyboards, pointer devices, and/or keypads, mass storage devices, microphones 896, payment mechanisms 898 such as bill and/or coin acceptors/dispensers, credit/debit card readers, Bluetooth and/or near-field communication (NFC) interfaces or other interfaces for receiving and/or dispensing currency and/or credit, and wireless communication devices. In this embodiment, each of the devices/elements 886-898 is connected to the EGM through a respective transceiver pair 812, 814, which provides power and allows data communication between the devices/elements 886-898 and the other components of the EGM 800, such as the processor 876, the memory device 878, and/or the power supply 882, etc.

Figure 9:
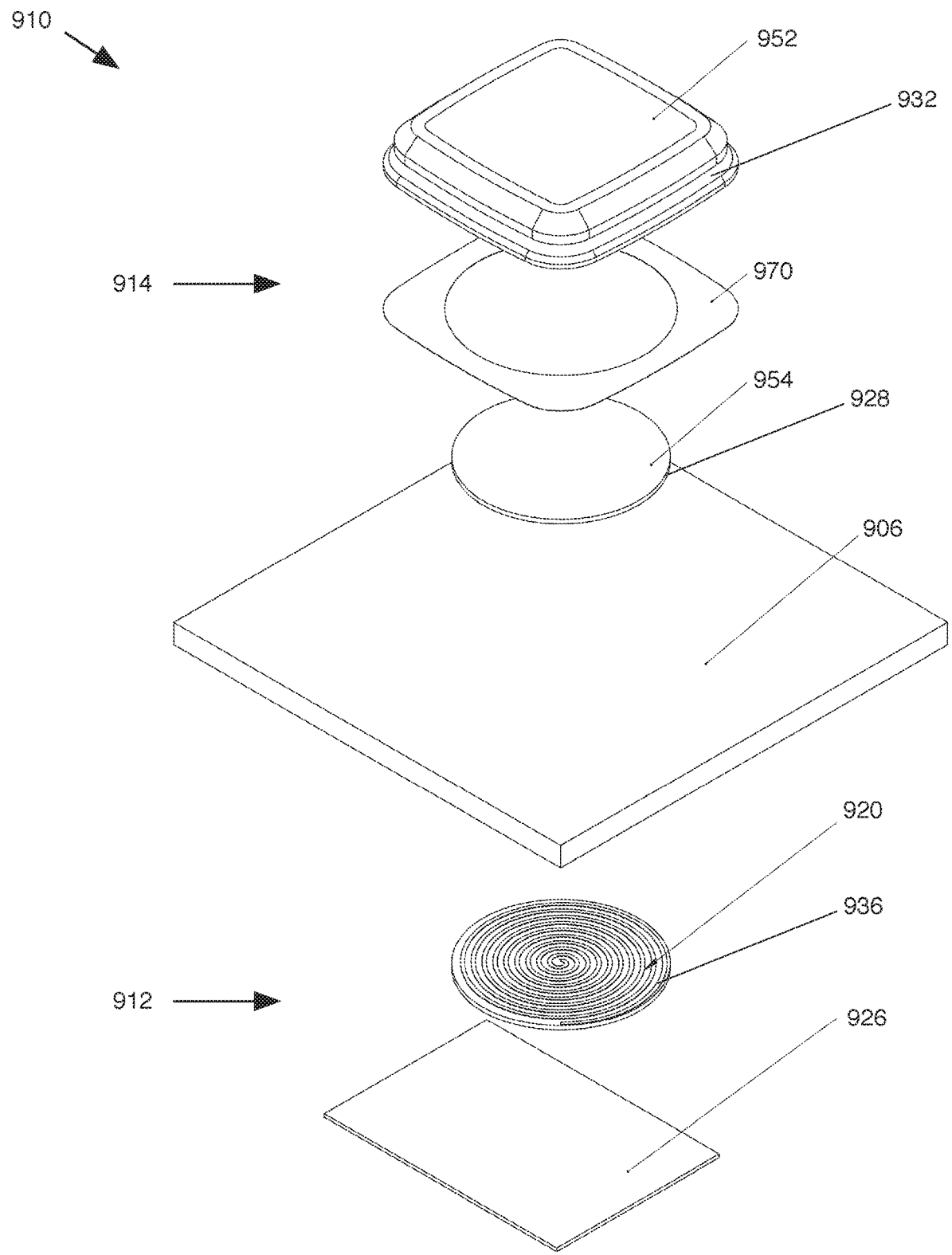
FIG. 9 is an exploded isometric diagram of a user interface assembly according to another embodiment.

In some embodiments, the functionality of the user-interface assembly can be accomplished using a relatively thin form factor. In this regard, FIG. 9 is an exploded isometric diagram of a user interface assembly 910 according to another embodiment. In this embodiment, a first-side transceiver subassembly 912 is attached to a barrier substrate 906, e.g., strengthened glass or plastic. The first-side transceiver subassembly 912 includes a flat first-side transceiver circuit 936, a flat first side antenna 920 and a first-side device interface circuit 926. On the opposite side of the barrier substrate 906, the second-side transceiver subassembly 914 includes a flat second-side transceiver circuit 954 and a flat second-side antenna 928. The second-side user-interface circuit 932, which includes a button 952 or other user interface element, is coupled to the second-side transceiver circuit and is attached to the barrier substrate 906 using a non-destructive adhesive 970 or other appropriate mounting method.

In some embodiments, one or more internal or external peripheral devices may communicate with the processor through a universal serial bus (USB) hub (not shown) connected to the processor 876. Although some components are illustrated as being integrated with the EGM 800 and other components are illustrated as being external to the barrier 806 of the EGM housing 802, any of the components therein may be external to the EGM 800, housing 802, and/or barrier 806, and may be communicatively coupled thereto. It should also be understood that the features and embodiments described herein are not limited to EGMs or gaming machines exclusively. For example, other applications include movable objects where providing a wiring harness is not possible or practical, such as a movable armrest, or a movable panel. In some embodiments, moving the object containing one portion of the user interface assembly disables the user interface assembly by moving the one portion of the user interface assembly away from the other so that power can no longer be provided wirelessly to the user interface element(s).

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented by hardware (including as stand-alone printed circuit boards (PCBs), induction coils, RGB LEDs, etc.), by software (including firmware, resident software, microcode, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A user interface assembly for a gaming device comprising:
    a first-side transceiver subassembly coupled to the gaming device in an internal portion of the gaming device on a first side of a barrier of the gaming device, wherein the barrier comprises a non-metallic material that is between the internal portion of the gaming device and an area outside of the gaming device, the first-side transceiver subassembly comprising:
        a first-side antenna;
        a first-side transmitter circuit electronically coupled to the first-side antenna to transmit an electromagnetic power signal through the barrier via the first-side antenna; and
        a first-side device interface electronically coupling the first-side transmitter circuit to a power supply of the gaming device; and
    a second-side transceiver subassembly coupled to the gaming device in the area outside of the gaming device on a second side of the barrier opposite the first-side transceiver subassembly, the second-side transceiver subassembly comprising:
        a second-side antenna disposed opposite the first-side antenna relative to the barrier;
        a second-side receiver circuit electronically coupled to the second-side antenna to receive, via the second-side antenna, the electromagnetic power signal transmitted through the barrier; and
        a second-side user interface circuit electronically coupled to the second-side receiver circuit, the second-side user interface circuit comprising a first user interface element to output a visual indication that is powered by the electromagnetic power signal in response to the second-side receiver circuit receiving the electromagnetic power signal, wherein the visual indication is visually detectable by a user of the gaming device.

2. The user interface assembly of claim 1, wherein the second-side user interface circuit comprises a second user interface element to receive an input from the user,
    wherein the second-side transceiver subassembly further comprises a second-side transmitter circuit electronically coupled to the second-side antenna to transmit, in response to the second user interface element receiving the input from the user, a first electromagnetic data signal through the barrier via the second-side antenna, and
    wherein the first-side transceiver subassembly further comprises a first-side receiver circuit electronically coupled to the first-side antenna to receive, via the first-side antenna, the first electromagnetic data signal transmitted through the barrier, and to provide the first electromagnetic data signal to a processor circuit of the gaming device.

3. The user interface assembly of claim 2, wherein the first-side transceiver subassembly comprises a first-side transceiver circuit, and
wherein the first-side transceiver circuit comprises the first-side transmitter circuit and the first-side receiver circuit.

4. The user interface assembly of claim 2, wherein the second-side transceiver subassembly comprises a second-side transceiver circuit, and
wherein the second-side transceiver circuit comprises the second-side transmitter circuit and the second-side receiver circuit.

5. The user interface assembly of claim 2, wherein the second user interface element further comprises a mechanical button, and
wherein the input from the user comprises a button press of the mechanical button by the user.

6. The user interface assembly of claim 2, wherein the electromagnetic power signal comprises a first electromagnetic power signal and a second electromagnetic data signal, and
wherein receiving the second electromagnetic data signal by the second-side receiver circuit causes the first user interface element to output the visual indication to the user of the gaming device.

7. The user interface assembly of claim 6, wherein the electromagnetic power signal comprises a combined electromagnetic power signal comprising the second electromagnetic data signal.

8. The user interface assembly of claim 1, further comprising a movable subassembly coupled to the gaming device, wherein the second-side receiver circuit is coupled to the movable subassembly,
wherein the movable subassembly is selectively movable between a first position and a second position,
wherein the second-side receiver circuit is within an electromagnetic power signal transmission range of the first-side transmitter circuit when the movable subassembly is in the first position, and
wherein the second-side receiver circuit is outside the electromagnetic power signal transmission range of the first-side transmitter circuit when the movable subassembly is in the second position.

9. The user interface assembly of claim 8, wherein the movable subassembly comprises a movable armrest movable between the first position and the second position.

10. The user interface assembly of claim 1, wherein the first user interface element comprises a light emitting diode (LED), and wherein the visual indication comprises light emitted by the LED.

11. The user interface assembly of claim 1, wherein the first user interface element comprises a graphical display, and wherein the visual indication comprises a graphical image displayed by the graphical display.

12. The user interface assembly of claim 1, wherein the second-side user interface circuit further comprises a second user interface element to output an audio indication that is powered by the electromagnetic power signal in response to the second-side receiver circuit receiving the electromagnetic power signal, wherein the audio indication is detectable by the user of the gaming device.

13. The user interface assembly of claim 1, wherein the second-side user interface circuit further comprises a second user interface element to output a haptic indication that is powered by the electromagnetic power signal in response to the second-side receiver circuit receiving the electromagnetic power signal, wherein the haptic indication is detectable by the user of the gaming device.

14. A method of operating a user interface assembly for a gaming device, the method comprising:
transmitting, by a first-side transmitter circuit coupled to the gaming device in an internal portion of the gaming device on a first side of a barrier of the gaming device, an electromagnetic power signal through the barrier via a first-side antenna on the first side of the barrier, wherein the barrier comprises a glass panel that is between the internal portion of the gaming device and an area outside of the gaming device;
receiving, by a second-side receiver circuit coupled to the gaming device in the area outside of the gaming device on a second side of the barrier, the electromagnetic power signal through the barrier via a second-side antenna on the second side of the barrier opposite the first-side antenna relative to the barrier; and
in response to the second-side receiver circuit receiving the electromagnetic power signal, outputting a visual indication via a first user interface element of a second-side user interface circuit that is powered by the electromagnetic power signal, wherein the visual indication is visually detectable by a user of the gaming device.

15. The method of claim 14, further comprising:
receiving, at a second user interface element of the second-side user interface circuit, an input from the user;
transmitting, by a second-side transmitter circuit on the second side of the barrier, an electromagnetic data signal through the barrier via the second-side antenna; and
receiving, by a first-side receiver circuit on the first side of the barrier, the electromagnetic data signal through the barrier via the first-side antenna.

16. A gaming device comprising:
a housing comprising an internal portion, the housing comprising a barrier that comprises an electrical insulator between the internal portion of the gaming device and an area outside of the gaming device;
a power supply; and
a user interface assembly comprising:
a first-side transceiver subassembly coupled to the gaming device in the internal portion of the housing on a first side of the barrier, the first-side transceiver subassembly comprising:
a first-side antenna;
a first-side transmitter circuit electronically coupled to the first-side antenna to transmit an electromagnetic power signal through the barrier via the first-side antenna; and
a first-side device interface to electronically couple the first-side transmitter circuit to the power supply; and
a second-side transceiver subassembly coupled to the gaming device in the area outside of the gaming device on a second side of the barrier opposite the first-side transceiver subassembly, the second-side transceiver subassembly comprising:
a second-side antenna disposed opposite the first-side antenna relative to the barrier;
a second-side receiver circuit electronically coupled to the second-side antenna to receive, via the second-side antenna, the electromagnetic power signal transmitted through the barrier; and
a second-side user interface circuit electronically coupled to the second-side receiver circuit, the second-side user interface circuit comprising a first user interface element to output an indication to a user of the gaming device in response to the second-side receiver circuit receiving the electromagnetic power signal.

17. The gaming device of claim 16, wherein the second-side user interface circuit comprises a second user interface element to receive an input from the user,
   wherein the second-side transceiver subassembly further comprises a second-side transmitter circuit electronically coupled to the second-side antenna to transmit, in response to the second user interface element receiving the input from the user, a first electromagnetic data signal through the barrier via the second-side antenna, and
   wherein the first-side transceiver subassembly further comprises a first-side receiver circuit electronically coupled to the first-side antenna to receive, via the first-side antenna, the first electromagnetic data signal transmitted through the barrier, and to provide the first electromagnetic data signal to a processor circuit of the gaming device.

18. The gaming device of claim 16, wherein the electromagnetic power signal comprises a first electromagnetic power signal and a second electromagnetic data signal, and
   wherein receiving the second electromagnetic data signal by the second-side receiver circuit causes the first user interface element to output the indication to the user of the gaming device.

19. The gaming device of claim 16, wherein the barrier comprises a tempered glass panel.

20. The gaming device of claim 19, wherein the tempered glass panel further comprises an embedded display.

\* \* \* \* \*